April 10, 1962     C. H. CURRIE ET AL     3,028,960
HIGH-SPEED SCANNING TYPE SORTER
Filed Sept. 9, 1957     3 Sheets-Sheet 1
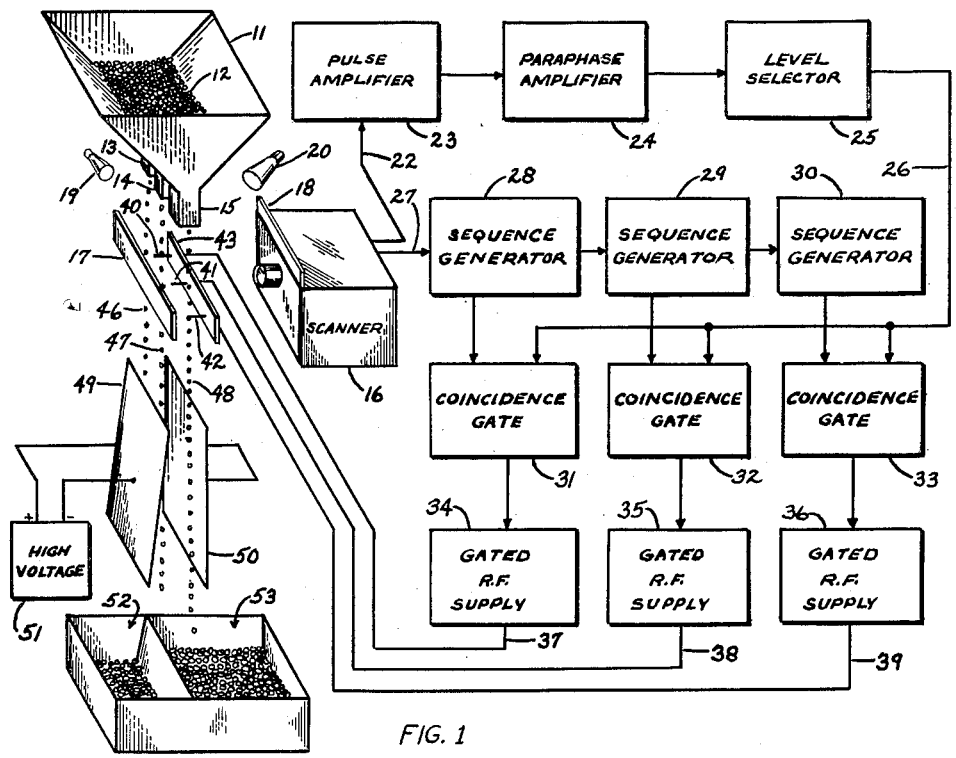
FIG. 1
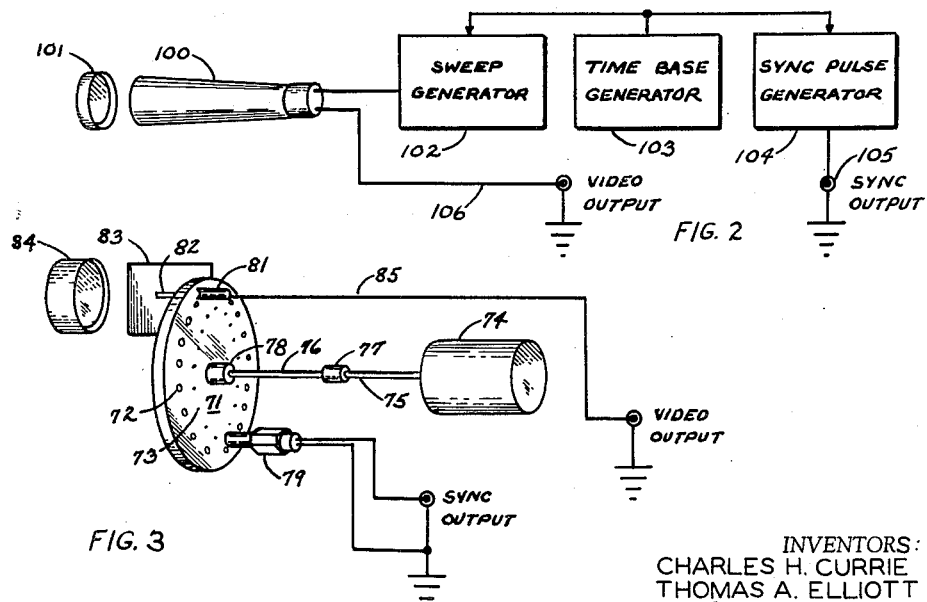
FIG. 2
FIG. 3
INVENTORS:
CHARLES H. CURRIE
THOMAS A. ELLIOTT
BY
ATTORNEY.

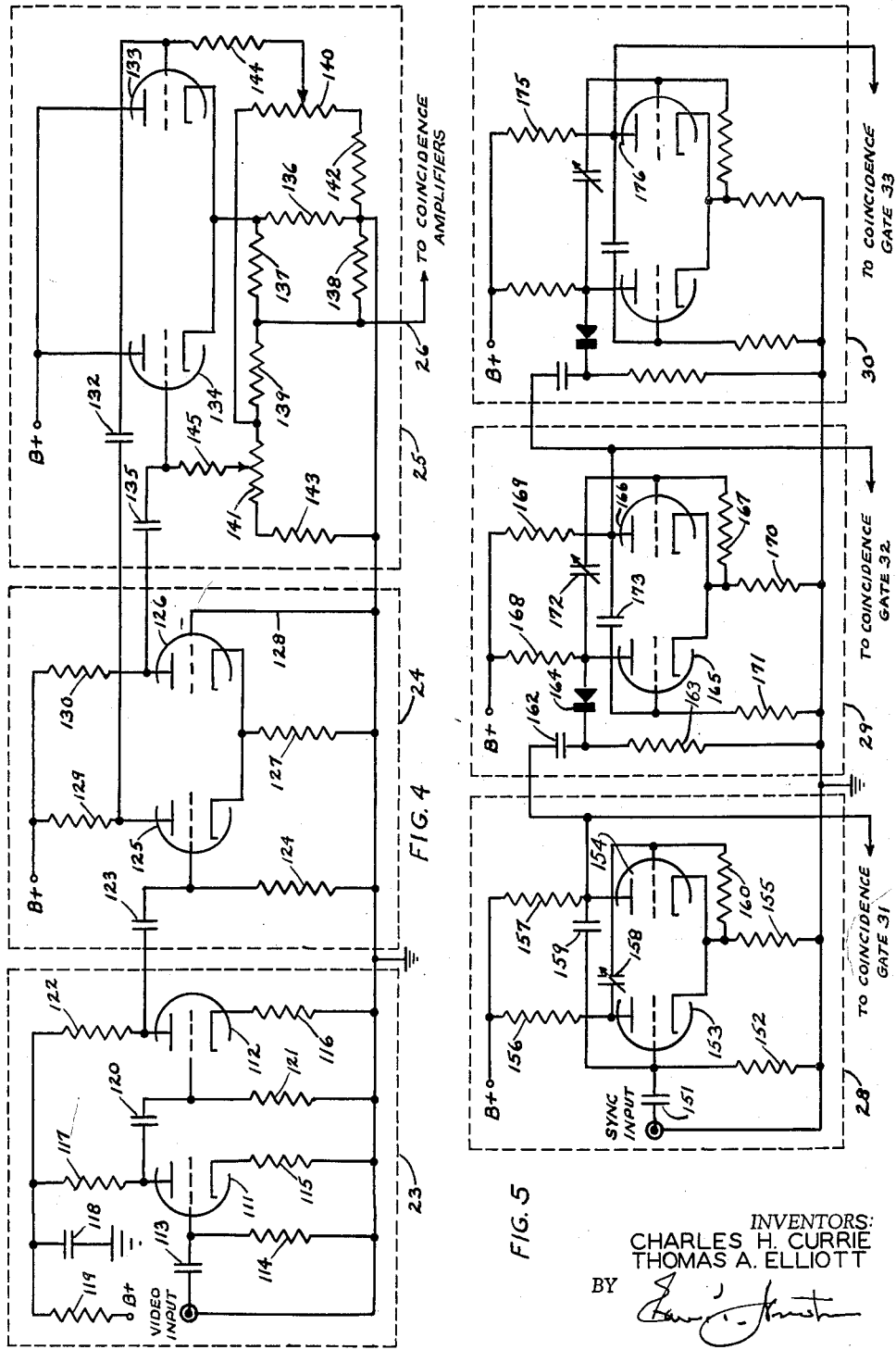

April 10, 1962 C. H. CURRIE ET AL 3,028,960
HIGH-SPEED SCANNING TYPE SORTER
Filed Sept. 9, 1957 3 Sheets-Sheet 3
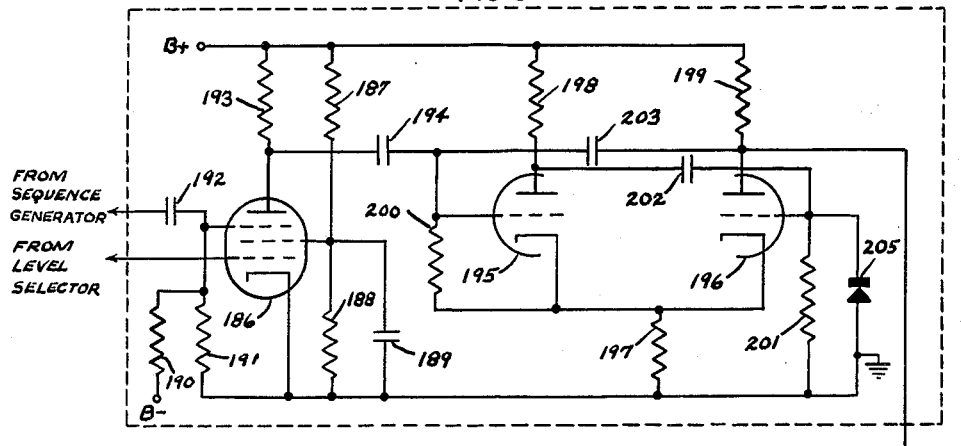
FIG. 6
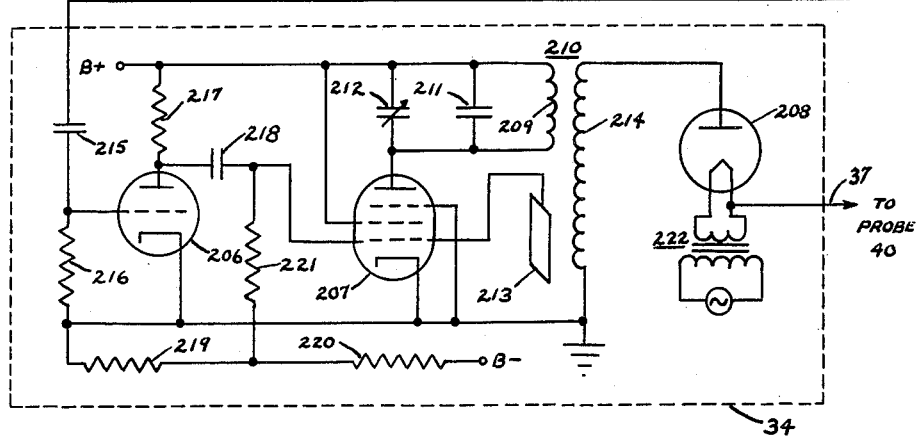
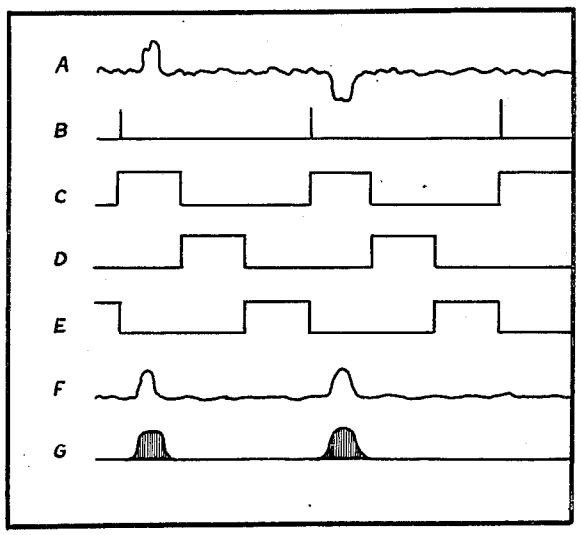
FIG. 7
INVENTORS:
CHARLES H. CURRIE
THOMAS A. ELLIOTT
BY 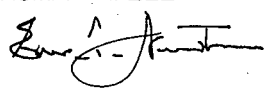
ATTORNEY.

United States Patent Office 3,028,960
Patented Apr. 10, 1962

3,028,960
HIGH-SPEED SCANNING TYPE SORTER
Charles H. Currie and Thomas A. Elliott, Decatur, Ga., assignors to Georgia Tech Research Institute, Atlanta, Ga., a corporation of Georgia
Filed Sept. 9, 1957, Ser. No. 682,858
21 Claims. (Cl. 209—111.5)

This invention relates generally to a high-speed scanning type sorter, and more particularly to apparatus for rapidly determining the quality of materials or foodstuffs by scanning their surface area in increments and sorting the same in accordance with such determination. The invention further provides for a method of simultaneously grading multiple columns of materials or foodstuffs according to their color or the intensity of light reflected from their surfaces as they move past a scanning line which is in the plane of motion but generally transverse to the direction of motion of the materials or foodstuffs.

Present systems for grading seeds and other small articles generally employ one or more photoelectric cells which simultaneously receive the light reflected from the surface of each individual article and accept or reject the articles in a single-file manner. The actual rejection in such systems is usually accomplished by either mechanical, pneumatic, or electrostatic means.

One of the major disadvantages to these present-day systems lies in their lack of sensitivity to small defects. The light reaching the photoelectric cells is received simultaneously from the entire surface area of the article which is in view of the photoelectric cells. This is necessary because the only scanning of the article is due to its motion and the entire article must be evaluated. Since a large portion of an article being evaluated must be observed at any time, those imperfections which are small compared to the observed area cannot be successfully detected.

A further handicap to efficient sorting which is inherent in present systems is that a large number of sorting units are required to permit the grading of any appreciable quantity of articles per unit time. This results because the quantity of articles handled by one sorting unit in a single file manner can be increased only by increasing the speed of handling; and, since present sorters are pushing this factor to the limit, little improvement can be expected by an increased rate of flow.

Therefore, one of the objects of the present invention is to provide an improved automatic sorting system which is capable of grading or sorting a large number of articles per unit time.

Another object of the present invention is to provide an automatic high-speed sorting system in which the scanning and evaluating of each article is accomplished in increments thereby enabling the system to be highly sensitive to small defects in the articles being sorted or graded.

A further object of this invention is to provide an improved automatic sorting system in which both the front and rear sides of each article are evaluated in the scanning process.

Still another object of this invention is to provide an automatic high-speed sorting system which is simple in construction and operation and which lends itself to the demands of economic manufacture.

In accordance with the objects of the invention, several columns of small articles freely fall past a photosensitive scanning device such as a rotating disc scanner or industrial iconoscope. The scanner, as employed in this invention, scans across the several columns of freely falling articles in one dimension with scanning in the other dimension being accomplished by movement of the articles past the scanning line.

A mirror arrangement permits complete area scanning of both the front and rear sides of the articles in each column as they pass through the illuminated field of scan, and a suitable background behind the field of scan provides a reflection reference for quality comparison.

The output of the scanning system, having a video signal with information as to the quality of each increment of each article and a synchronous signal indicating the beginning of each scan sweep in which that increment occurs, is fed to the operational circuits of the system which synchronize the quality determination with the sorting operation as hereinafter described.

Upon the appearance of a defect in an article in one of the columns being scanned, the operational circuits of the system electrically charge the defective article by means of a corona discharge probe. Thereupon, in the continued free fall of the article past the deflecting plates, it is deflected out of the normal free fall path and into a reject hopper.

Whereas the electrostatic deflection method herein employed by way of example lends itself more readily to the sorting of particular classes of small articles, such as seeds, it is to be understood that the actual rejecting or sorting may be effected either by mechanical, pneumatic, or electrostatic means, depending on weight and material considerations. Those skilled in the art will further recognize the high-speed sorting apparatus herein described in a detailed manner using three columns of articles is merely by way of example, and that the invention, in its commercialized embodiment depending upon the application, could easily be used to scan as many as twelve columns of small articles.

For a more complete understanding of the invention, reference is now made to the accompanying drawing wherein like numerical designator indicate corresponding parts, and wherein:

FIG. 1 is a diagrammatic presentation of the general system of the present invention;

FIG. 2 is an embodiment of an electronic scanner which can be used in the system of the present invention;

FIG. 3 is an embodiment of the electro-mechanical scanner which can be used in the system of the present invention;

FIG. 4 is a detailed circuit diagram of the pulse amplifier, the paraphase amplifier, and the lever selection circuits;

FIG. 5 is a detailed circuit diagram of the sequence gate generators of the present invention;

FIG. 6 is a detailed circuit diagram of a coincidence gating circuit and radio-frequency power supply of the present invention; and, FIG. 7 portrays a series of graphs which illustrate signal wave shapes occurring in different portions of the circuits of FIGS. 4, 5, and 6.

Referring now particularly to FIG. 1, the overall system illustrated therein generally comprises a hopper 11 containing small articles 12 to be graded or sorted and having three chutes 13, 14, and 15 which feed the articles out of the hopper in single file manner to free-fall therefrom through the automatic scanning and sorting system of the present invention.

The scanning apparatus comprises scanning camera equipment generally designated at 16 which can be either electro-mechanical or electronic as hereinafter described, an elongate reflecting mirror 17 tilted slightly to reflect the camera scan onto a color reference background 18, and lamps 19 and 20 which illuminate the small articles as they pass through the field of scan.

The scanning apparatus yields two outputs: a video output containing information as to the quality of each article and a synchronous output trigger signal, hereinafter referred to as a sync signal, which indicates the beginning of each scan sweep.

The video pulses are carried by conductor 22 to pulse amplifier 23, and from there to paraphase amplifier 24 which yields positive outputs for both positive and negative inputs. The video information signal is then fed into level selection circuit 25 which determines the minimum pulse amplitude necessary to be carried by conductor 26 as a rejection pulse to the coincidence amplifiers 31, 32 and 33 to thereafter operate the sorting apparatus as hereinafter described. The sync signals from the scanning apparatus are carried by conductor 27 to sequence gate generator 28 which produces a gating pulse of predetermined duration to "turn on" the coincidence amplifier 31. The trailing edge of the gating pulse from sequence gate generator 28, triggers sequence gate generator 29 whose output pulse "turns on" its associated coincidence amplifier 32. In a like manner, the trailing edge of the gating pulse from sequence generator 29 triggers sequence gate generator 30 whose output pulse turns on its associated coincidence amplifier 33. The total time duration of the three sequence gating pulses equals the time for one sweep of the scanning camera across the three columns of free falling articles. In this manner, each gating pulse occurs during the time that corresponding column of articles is being scanned, so as to gate or "turn on" the proper coincidence amplifier to pass a rejection pulse from the level selector circuit into the proper rejection channel.

Rejection pulses passed by the coincidence amplifiers in proper time sequence are used to gate the radio-frequency power supplies 34, 35 and 36, which supply a high-voltage radio-frequency pulse over conductors 37, 38 and 39, respectively, to corona discharge probes 40, 41 and 42, respectively, which are located close to the scan sector, each adjacent a column of freely falling articles. Insulator board 43 supports the probes in operative position.

Articles passing a discharge probe which has a high positive potential thereon receive a charge by corona discharge between the probe and article. Thereafter, the small articles, generally indicated in columns as at 46, 47 and 48, fall between electrostatic deflection plates 49 and 50, having a large potential difference applied thereto by power supply 51. Those articles having a charge thereon are deflected toward the negative plate 49, and into reject bin 52, while the uncharged articles continue in their normal path into the quality bin 53.

In an application of the present invention to the sorting of seeds, tests have indicated that the peak pulse necessary for charging is on the order of 20,000 volts, to permit the corona discharge over about a half inch or more of spacing between the free-fall path and the discharge probe. In addition, deflection plates 20–24 inches long and spaced two inches at the top and six inches at the bottom give satisfactory results with a potential difference of 46,000 volts, with the maximum potential to ground from either plate being 23,000 volts.

FIG. 2 shows an electronic scanning apparatus which can be used in another embodiment of this invention. The basic element of this system is the electronic scanning tube generally indicated at 100 which may be any of the types employed in the television industry, such as the flying spot scanner and image orthicon. However, for purposes of economic construction, it is considered expedient to use either the vidicon or industrial iconoscope. A suitable lens, as at 101 would normally be provided in front of the camera tube so as to properly focus the article image in a manner well known to those skilled in the art.

The tube is swept in one dimension only, i.e., horizontally, by sweep generator 102 which is controlled by pulses from time base generator 103. The time base generator also triggers synchronous pulse generator 104 which provides sync trigger signals at output 105 corresponding to the initiation of each scan sweep. The video output of the scanning tube is taken by conductor 106 to the operational circuits of the sorting system as hereinafter described.

Referring now to FIG. 3, the generally conventional electro-mechanical scanning apparatus therein disclosed comprises a rotatable disc 71 having 20 scanning apertures 72 therethrough and spaced radially thereabout, and 20 magnetic pins 73 imbedded therein in a radial manner. The disc 71 is driven from 3600 r.p.m. synchronous motor 74 coupled thereto by shafts 75 and 76, flexible connector 77, and disc hub 78. The imbedded magnetic pins 73 in conjunction with a magnetic pickup 79 provide sync trigger signals for the operational circuits of the sorting system. Scanning takes place by means of the photomultiplier tube such as type 931–A, generally depicted at 81, in conjunction with the disc 71, image limiting slot 82 in baffle 83, and compound lens 84. Output of the photomultiplier tube 81 is taken by conductor 85 to the operational circuits of the sorting system.

Since it has been determined that for an effective incremental evaluation of the falling articles a rate of 1200 scans per second would be required, the bandwidth limitations on the scanning system components must be taken into consideration. To scan from 6 to 12 columns of articles would require a bandwidth of approximately 4–8 megacycles in the scanning apparatus and video amplifiers. It would be apparent to those skilled in the art, that this bandwith could more readily be obtained with an electronic scanner than with the electro-mechanical scanner in view of the present state of the scanning art.

Referring now to the detailed schematic of the pulse amplifier, paraphase amplifier, and level selection circuits of FIG. 4, it can be seen that the video pulse amplifier 23 includes a dual-triode amplier tube having separate triode sections 111 and 112. The video input signal from the scanning apparatus, having both positive and negative pulses, is applied by coupling capacitor 113 across grid-leak resistor 114 to the control grid of triode 111. Grid bias for triodes 111 and 112 is developed across unbypassed cathode resistors 115 and 116, respectively. Plate voltage is supplied to triode 111 from B+ through plate load resistor 117 and a decoupling network comprising capacitor 118 and resistor 119. The output signal of triode 111, developed across its plate resistor 117, is applied by coupling capacitor 120 across grid-leak resistor 121 to the control grid of triode 112. Plate voltage is supplied to triode 112 from B+ through its plate load resistor and decoupling network 118, 119.

The output signal of the pulse amplifier 23, developed across plate resistor 122 of triode 112, is supplied to paraphase amplifier 24, being applied by coupling capacitor 123 across grid-leak resistor 124 to the control grid of triode 125. Triode amplifiers 125 and 126, separate sections of a dual-triode tube, are connected as a differential amplifier, with bias supplied by common cathode resistor 127 and with the control grid of triode 126 connected to ground by conductor 128. Plate voltage is supplied to the triodes 125 and 126 from B+ through plate load resistors 129 and 130, respectively.

In operation, a positive voltage pulse impressed on the grid of triode 125 causes a pulse of current through the tube which develops a negative voltage pulse across plate resistor 129. At the same time, the pulse of current through triode 125, momentarily increases the voltage drop in common cathode resistor 127, thereby momentarily increasing the bias to triode 126 to decrease current therein so as to develop a positive voltage pulse across plate resistor 130. In a converse manner, a negative pulse impressed on the grid of triode 125 results in a positive voltage pulse developed across the plate resistor 129, and a negative voltage pulse developed across plate resistor 130. The arrangement is such, therefore, that for purposes as will hereinafter be explained, a positive video input pulse coupled to paraphase amplifier 24 results in a positive pulse at the plate of triode 126, and a negative video input pulse results in a positive pulse at the plate of triode 125.

Both positive and negative output signals of the paraphase amplifier 24 are fed to level selector circuit 25, which is a cathode follower mixer embodied as a dual-triode amplifier having separate triode sections 133 and 134 with the plates of each connected directly to B+ and the cathodes of each connected to ground through common load resistor 136. The pulses developed across plate load resistor 129 of triode 125 are applied by coupling capacitor 132 to the control grid of triode 133; in a like manner, the pulses developed across plate load resistor 130 of triode 126 are applied by coupling capacitor 135 to the control grid of triode 134. Both triodes 133 and 134 are normally biased beyond cut off so that only positive pulses from paraphase amplifier 24 are capable of initiating conduction therein. Input pulse level selection is provided by a variable grid-biasing arrangement for each of the control grids. The voltage dividing resistors 137 and 138 are connected in series between the common cathodes and ground, and resistor 138 also is shunted by a voltage divider consisting of resistor 139 in series with a parallel arrangement of potentiometers 140 and 141 in series with resistors 142 and 143, respectively. Variable grid bias for triodes 133 and 134 is picked off of potentiometers 140 and 141, respectively, and applied to the control grids of the triodes through grid resistors 144 and 145, respectively.

Both triodes 133 and 134 of the level selection stage 25 are normally cut off by the grid biasing arrangement. Dark level selection by potentiometer 140 determines the amplitude of pulse from the scanning apparatus, resulting from a darker than normal increment of an article in the scan path, which is necessary to cause the triode 133 to conduct; in a like manner, light level selection by potentiometer 141 determines the amplitude of pulse from the scanning apparatus, resulting from a lighter than normal increment of an article in the scan path, which is necessary to cause the triode 134 to conduct. The arrangement is such that conduction of either triode indicates that an increment of an article being scanned falls above the present bias level selected and the article should therefore be sorted from the others.

The output of the level selection circuit 25 is taken from midway of the voltage divider 137, 138, and fed to the control grids of the coincidence amplifiers, as hereinafter described.

Referring now to FIG. 5, positive sync trigger signals from the scanning apparatus, each corresponding to the initiation of a scan sweep, are supplied to sequence gate generator 28, being applied by coupling capacitor 151 across grid-leak resistor 152 to the grid of triode 153. Triodes 153 and 154, separate sections of a dual-triode tube, are connected as a cathode-coupled one-shot multivibrator stage, having their cathodes connected to ground through common cathode resistor 155. Plate supply voltages for the triode 153 and 154 are obtained from B+ through plate load resistors 156 and 157, respectively. In quiescent operation, having grid and cathode tied together through resistor 160, triode 154 conducts heavily, developing across common cathode resistor 155 a voltage drop which is coupled by grid-leak resistor 152 as a bias to the grid of triode 153, driving it to cut off. When a positive sync pulse is impressed on the grid of triode 153, the one-shot action begins, with triode 153 beginning to conduct, thereby dropping its plate voltage. This decrease in plate voltage is coupled to the grid of triode 154 through variable capacitor 158 as a negative-going voltage, decreasing conduction in triode 154 whereby its plate voltage increases. This increase is coupled back to the grid of triode 153 as a positive-going voltage by capacitor 159, thereby speeding up the switching action which continues until triode 154 is cut off and triode 153 is conducting heavily. The circuit remains in this condition until variable capacitor 158, which was charged during equilibrium, discharges sufficiently through triode 153 and resistor 160 toward the lowered value of plate voltage of triode 153 to allow the grid of triode 154 to rise above cut off thereby initiating a return to equilibrium condition. The output from sequence gate generator 28, the duration of which can be preset by adjustment of capacitor 158, is taken as a positive-going square wave voltage developed across the plate resistor of triode 154 and fed both to the suppressor grid of coincidence amplifier 31, as hereinafter described in detail with reference to FIG. 6, and also to sequence gate generator 29 to initiate operation thereof.

Sequence gate generator 29 receives the square wave output from gate generator 28 and differentiates it by capacitor 162 and resistor 163 to obtain positive and negative spikes corresponding to the leading and trailing edges of the square wave pulse. Diode 164 passes the negative spike to initiate operation of the cathode coupled, one-shot, multivibrator which includes dual-triodes 165 and 166. Plate voltage for the triodes 165 and 166 is obtained from B+ through plate load resistors 168 and 169, respectively.

In quiescent operation, triode 166, having grid and cathode tied together through resistor 167, conducts heavily, thereby developing across common cathode resistor 170 a voltage drop which is coupled by grid-leak resistor 171 as a bias to the grid of triode 165, driving it to cut off. When a negative spike through diode 164 is applied to the plate of triode 166 and coupled therefrom by variable capacitor 172 to the grid of triode 166, the one-shot action begins, with conduction of triode 166 decreasing, thereby increasing its plate voltage. This increase in plate voltage is coupled as a positive-going step voltage to the grid of triode 165 through capacitor 173, initiating conduction therein, whereby its plate voltage decreases. This decrease in plate voltage is coupled back to the grid of triode 166 as a negative-going step voltage by capacitor 172, thereby speeding up the switching action which continues until triode 166 is cut off and triode 165 is conducting heavily. The circuit remains in this condition until variable capacitor 172, which was charged during equilibrium, discharges sufficiently through triode 165 and resistor 167 toward the lowered value of plate voltage of triode 165 to allow the grid of triode 166 to rise above cut off thereby initiating a return to equilibrium condition. The output from sequence gate generator 29, the duration of which can be preset by adjustment of capacitor 172, is taken as a positive-going square wave developed across plate resistor 169 of triode 166 and fed both to the suppressor grid of coincidence amplifier 32 and to sequence gate generator 30 to initiate operation thereof.

Sequence gate generator 30 is identical in construction and operation to gate generator 29 except that its output gating pulse, developed across plate load resistor 175 of triode 176, is fed only to coincidence amplifier 33.

It will be apparent to those skilled in the art, that, in an application where more than three columns of seeds or other articles are to be scanned, additional sequence gate generators identical to gate generator 29 may be provided and so adjusted that each gating pulse therefrom occurs during the time that a corresponding column of articles is being scanned.

FIG. 6 shows a detailed schematic of the coincidence gating circuit 31 and radio-frequency power supply circuit 34, which are identical in construction to coincidence gates 32, 33 and power supplies 35, 36, depicted in block diagram form in FIG. 1. Positive video signals from level selection or "bandpass" circuit 25 are impressed upon the control grid of the pentode 186, the cathode of which is connected directly to ground. The screen grid, which normally conducts heavily, obtains its positive potential from voltage dividing resistors 187 and 188 connected between B+ and ground; resistor 188 being bypassed to ground by capacitor 189. The suppressor grid of the pentode 186 is normally held at a negative potential by voltage dividing resistors 190 and 191 which are connected between ground and B—. Plate voltage is supplied to the pentode from B+ through plate load resistor 193. Positive pulses from sequence gate generator 28, applied to the suppressor grid of pentode 186 by coupling capacitor 192, "gate through" the pentode any video signal pulses impressed upon its control grid.

The output signal of the pentode, developed as a negative-going pulse across load resistor 193, is applied by coupling capacitor 194 to the grid of triode 195. Triodes 195 and 196, separate sections of a dual-triode tube, are connected as a cathode coupled, one-shot, multivibrator stage, having their cathodes connected to ground through common cathode resistor 197. Plate voltages for these triodes are obtained from B+ through plate load resistors 198 and 199, respectively. In quiescent operation, triode 195, having grid and cathode tied together through resistor 200, is conducting heavily, thereby developing across common cathode resistor 197 a voltage which is coupled by grid-leak resistor 201 to the grid of triode 196 as a bias driving it to cut off. When a negative pulse is impressed upon the grid of triode 195, the one-shot action begins with the current in triode 195 decreasing, whereby its plate voltage is increased. This increase in plate voltage is coupled to the grid of triode 196 by coupling capacitor 202 as a positive-going step voltage, initiating conduction in triode 196 whereby its plate voltage decreases. This decrease is coupled back to the grid of triode 195 by capacitor 203 as a negative-going step voltage, thereby speeding up the switching action which continues until triode 195 is cut off and triode 196 is conducting heavily. The circuit remains in this condition until capacitor 203, which was charged during equilibrium, discharges sufficiently through triode 196 and resistor 200 toward the lowered value of plate voltage of triode 196 to allow the grid of triode 195 to rise above cut off, thereby initiating a sharp return to equilibrium condition. Upon reaching equilibrium, diode 205 which shunts grid-leak resistor 201 effects a quick discharge path for coupling capacitor 202, so as to provide for quick recovery of the multivibrator.

The output of the multivibrator stage is used to gate radio-frequency power supply 34, which includes a pulse inverting triode 206, a power pentode oscillator 207, and a high-voltage half-wave rectifier 208. Triode 206 is supplied plate voltage from B+ through plate load resistor 217 and has its cathode connected directly to ground. Pentode 207 is connected with its cathode and suppressor grid directly to ground, its screen grid directly to B+, and its plate to B+ through a parallel L-C tank consisting of primary winding 209 of high-voltage transformer 210 and capacitor 211. Trimmer capacitor 212 is provided so that the tank may be tuned to the natural resonant frequency of the secondary winding 214 to achieve maximum output voltage. Positive feedback to support oscillation is effected by the provision of a small metal pick-up plate near the high-voltage winding 214 of the transformer 210 which feeds energy back onto the control grid of the pentode. The output of the multivibrator stage of the sequence gate generator 31, taken as a negative-going square wave of 100 microseconds duration developed across plate load resistor 199, is used to gate radio-frequency power supply 34, being applied by coupling capacitor 215 across grid-leak resistor 216 to the grid of pulse inverting triode 206. The secondary winding of high-voltage transformer 210 is connected with one side to ground and the other side to the plate of half-wave rectifier 208. Filament transformer 222, insulated for high-voltage and of low capacity to ground, energizes the filament of rectifier 208. The control grid of pentode 207 is normally held at a negative cut off potential by voltage dividing resistors 219 and 220 connected between ground and B—. Current limiting resistor 221 is connected between the voltage divider and the control grid of the pentode.

When a negative pulse from sequence gate generator 31 is impressed upon the grid of triode 206, a positive pulse is developed across the plate load resistor 217 and applied by coupling capacitor 218 to the control grid of pentode 207, thereby initiating oscillations. These oscillations are coupled from the L-C tank by the transformer secondary winding 214 to half-wave rectifier 208 which passes the positive half of said oscillations to the high-voltage, low capacity cable 37 which connects directly to corona discharge probe 40.

In considering the overall operation of the sorting system, as the articles to be graded or sorted fall from the hopper through the illuminated scan sector, scanning takes place in two dimensions, horizontally by virtue of the scanning line itself, and vertically by virtue of the motion of the articles in the field of scan passing the scanning line. Scanning both front and back of the articles with a single scanner is accomplished by the use of a mirror system to project an image of the far side of the article into the field of scan which is completely scanned before the front of the article itself comes into the field of view of the scanner. Detection of imperfections is provided for by placing a background material of reflection characteristics similar to those of an article of high quality behind the field of scan, thereby supplying a reflection reference with which the scanner can compare the articles being graded.

The scanning device itself may be a flying spot scanner, a rotating disc scanner, or an electronic scanner such as the type employed in the television industry. Inexpensive commercial television camera tubes such as the vidicon and industrial iconoscope can be used in a low-cost scanning type sorter of the present invention.

For purposes of illustration, embodiments of the system with both the electro-mechanical rotating disc type scanner, and a electronic camera tube type scanner are described.

In the rotating disc scanning system, as the motor driven disc rotates, each scanning hole in turn sweeps a slightly arcuate line across the article image and permits light from successive points of the image to reach the photomultiplier tube in time sequence. The required scan rate has been determined at 1200 sweeps per second.

Generation of sync trigger signals is accomplished by the use of magnetic pins imbedded in the rotating disc and in conjunction with a magnetic pickup. By proper placement of the magnetic pickup, the moving magnetic pins generate trigger signals which correspond to the beginning of each scan sweep. These sync triggers are employed to initiate the sequence gate train used for gating the coincidence amplifiers as hereafter described.

In the electronic type scanning system, both the sync trigger signals and the scanning sweeps are controlled by the time base generator which generates 1200 reference pulses per second. Each of these reference timing pulses initiates operation of the sweep generator to sweep the camera tube, thereby permitting successive points on the image to be scanned in the time sequence. The reference timing pulses also control a pulse generator which produces sync signals coincidentally with the initiation of the scan sweeps.

The video output of the scanner, as shown in FIG. 7A, contains pulse information either positive, negative, or zero, which represents the difference between the light reflected from each scanned increment and the light reflected from the background. These pulses are fed to a paraphase amplifier which furnishes positive output pulses for both positive and negative inputs. The positive video pulses are acted upon by an amplitude or level selection circuit, which comprises two amplifiers, each biased beyond cut off but each with a variable bias control. The level selection circuit, being a bandpass arrangement, determines the minimum pulse amplitude required to deliver an output on through the time selecting coincidence circuits to the sorting apparatus. These coincidence circuits, one of which is provided for each column scanned, permit separation of the video output of the scanning system to correspond to the columns of articles being scanned. This is accomplished by utilizing the sync trigger, shown in FIG. 7B, which corresponds to the beginning of each scanner sweep to initiate a series of gating pulses, as in FIGS. 7C, 7D, and 7E. Each succeeding gating pulse is initiated by the trailing edge of the preceding pulse. The total number of these gating pulses is equal to the total number of columns of articles being scanned, so that each gating pulse occurs during the time that a corresponding column of articles is being scanned. These gating pulses are applied to the suppressor grids of the coincidence amplifiers which are normally biased to cutoff. The video output of the level selector circuit is fed to the control grids of the coincidence amplifier.

Each coincidence amplifier is gated by its corresponding sequence gating pulse, allowing a video pulse, if of sufficient amplitude to pass the level selection circuit, to be amplified, as shown in FIG. 7F. A video signal gated through one of the coincidence amplifiers is indicative of a defective increment in an article being scanned. Since, as previously discussed, it is desirable to reject articles having such defective increments, the outputs from the coincidence amplifiers are used to initiate a high-voltage pulse, as shown in FIG. 7E, which effects a positive static charge on the defective articles. This is accomplished by the provision of three pointed probes located close to the scan sector, each adjacent its respective column and connected to its respective high-voltage pulser.

As a defective increment of an article in one of the columns is recognized, the probe associated with that column ionizes the air between the article and the probe and effects a charge upon the article. The scanned articles, both charged and uncharged, continue to free fall, passing into the electric field existing between a set of deflection plates having a large potential difference thereon.

The charged articles passing through this electric field are deflected toward the negative plate while the normal trajectory of the uncharged seeds is unaffected. The proper placement of bins or chutes to separately receive the articles completes the sorting or grading process.

From the foregoing, it will be apparent that we have provided a novel sorting system which is well adapted to fulfill the aforestated objects of the invention. Moreover, whereas the invention has been disclosed in detail with respect to certain embodiments which give satisfactory results, it will be understood by those skilled in the art to which the invention most nearly appertains, that additional embodiments and modifications thereof may be provided without departing from the spirit or scope of the invention as defined by the appended claims.

We claim:

1. Sorting apparatus for use in combination with a plurality of columns of moving articles comprising a single photosensitive means for scanning across said columns, said scanning means producing an output indicative of a characteristic of light reflected from the surface of each of said articles in all said columns, selective means responsive to a predetermined characteristic level of said output, and means selectively controlled by said selective means for sorting articles having said predetermined characteristic level from said columns of articles.

2. Sorting apparatus for use in combination with a plurality of articles moving in a vertical path comprising a single photosensitive means for scanning across said path, said scanning means producing an output indicative of a characteristic of light reflected from a vertical increment of surface of each of said articles in all said columns, selective means responsive to a predetermined characteristic level of said output, and means selectively controlled by said selective means for sorting articles having a vertical increment with said predetermined characteristic level from said plurality of articles.

3. Sorting apparatus for use in combination with a plurality of articles moving in a vertical path comprising a single photosensitive means for scanning across said path, said scanning means producing an output indicative of a characteristic of light reflected from a vertical increment of surface of each of said articles in all said columns, selective means responsive to a predetermined characteristic level of said output, and means selectively controlled by said selective means for sorting articles having a vertical increment with said predetermined characteristic level from said plurality of articles.

4. Sorting apparatus for use in combination with a plurality of columns of vertically moving articles comprising a single photosensitive means for scanning across said columns, said scanning means producing an output indicative of a characteristic of light reflected from a vertical increment of surface of each of said articles, selective means responsive to a predetermined characteristic level of said output, and means controlled by said selective means for sorting articles having a vertical increment with said predetermined characteristic level from said plurality of columns of articles.

5. Sorting apparatus for use in combination with a plurality of columns of moving articles comprising a single photosensitive means for scanning across said columns, said scanning means producing an output indicative of a characteristic of light reflected from the surface of each of said articles, selective means responsive to a predetermined characteristic level of said output, synchronizing means for correlating said selective means with said plurality of columns, and means responsive to both said synchronizing means and said selective means for sorting articles having said predetermined characteristic level from said plurality of columns of articles.

6. Sorting apparatus for use in combination with a plurality of columns of verticaly moving articles comprising a single photosensitive means for scanning across said columns, said scanning means producing an output indicative of a characteristic of light reflected from vertical increments of the surface of each of said articles, selective means responsive to a predetermined characteristic level of said output, synchronizing means for correlating said selective means with said plurality of columns, and means responsive to both said synchronizing means and said selective means for sorting articles with vertical increments having said predetermined characteristic level from said plurality of columns of articles.

7. In sorting apparatus for use in combination with a plurality of moving articles, means to evaluate both the front and rear sides of said articles comprising means for scanning across a field substantially transverse to the direction of motion of said articles, background reference means disposed adjacent said scanning means, image reflecting means disposed in the direct field of scan of said scanning means and so orientated that said background reference means lies in the reflected field of scan of said scanning means, said articles moving between said image reflecting means on one side and said scanning means and backgroud means on the other, whereby each of said articles moves through both said direct and reflected fields of scan.

8. In sorting apparatus for use in combination with a plurality of columns of moving articles, means to evaluate both the front and rear sides of said articles comprising a single photosensitive means for scanning across a field substantially transverse to the direction of motion of said articles, background reference means disposed adjacent said scanning means, image reflecting means disposed in the direct field of scan of said scanning means and so orientated that said background reference means lies in the reflected field of scan of said scanning means, said columns of articles moving between said image reflecting means on one side and said scanning means and background means on the other, whereby each of said articles moves through both said direct and reflected fields of scan.

9. In sorting apparatus for use in combination with a plurality of moving articles, means to evaluate both the front and rear sides of said articles comprising photosensitive means for scanning across a field substantially transverse to the direction of motion of said articles, background reference means disposed adjacent said scanning means, image reflecting means disposed in the direct field of scan of said scanning means and so orientated that said background reference means lies in the reflected field of scan of said scanning means, said articles moving between said image reflecting means on one side and said scanning means and background means on the other, whereby each of said articles moves through both said direct and reflected fields of scan, said scanning means producing an output indicative of a characteristic of light reflected from the surface of each of said articles, selective means responsive to a predetermined characteristic level of said output, and means controlled by said selective means for sorting articles having said predetermined characteristic level from said plurality of articles.

10. In sorting apparatus for use in combination with a plurality of columns of moving articles, means to evaluate both the front and rear sides of said articles comprising a single photosensitive means for scanning across a field substantially transverse to the direction of motion of said articles, background reference means disposed adjacent said scanning means, image reflecting means disposed in the direct field of scan of said scanning means and so orientated that said background reference means lies in the reflected field of scan of said scanning means, said articles moving between said image reflecting means on one side and said scanning means and background means on the other, whereby each of said articles moves through both said direct and reflected fields of scan, said scanning means producing an output indicative of a characteristic of light reflected from the surface of each of said articles, selective means responsive to a predetermined characteristic level of said output, and means controlled by said selective means for sorting articles having said predetermined characteristic level from said plurality of columns of articles.

11. In sorting apparatus for use in combination with a plurality of columns of moving articles, means to evaluate both the front and rear sides of said articles comprising a single photosensitive means for scanning across a field substantially transverse to the direction of motion of said articles, background reference means disposed adjacent said scanning means, image reflecting means disposed in the direct field of scan of said scanning means and so orientated that said background reference means lies in the reflected field of scan of said scanning means, said articles moving between said image reflecting means on one side and said scanning means and background means on the other, whereby each of said articles moves through both said direct and reflected fields of scan, said scanning means producing an output indicative of a characteristic of light reflected from the surface of each of said articles, selective means responsive to a predetermined characteristic level of said output, synchronizing means for correlating said selective means with said plurality of columns, and means responsive to both said synchronizing means and said selective means for sorting articles having said predetermined characteristic level from said plurality of columns of articles.

12. In sorting apparatus for use in combination with a plurality of columns of moving articles, means to evaluate both the front and rear sides of said articles comprising means for scannnig across a field substantially transverse to the direction of motion of said articles, background reference means disposed adjacent said scanning means, image reflecting means disposed in the direct field of scan of said scanning means and so orientated that said background reference means lies in the reflected field of scan of said scanning means, said columns of articles moving between said image reflecting means on one side and said scanning means and background means on the other, whereby each of said articles moves through both said direct and reflected fields of scan, said scanning means producing an output indicative of a characteristic of light reflected from increments of the surface of each of said articles, selective means responsive to a predetermined characteristic level of said output, synchronizing means for correlating said selective means with said plurality of columns, and means responsive to both said synchronizing means and said selective means for sorting articles with increments having said predetermined characteristic level from said plurality of columns of articles.

13. Sorting apparatus for use in combination with a plurality of columns of freely falling articles comprising a single photosensitive means for scanning across said columns, said scanning means producing an output indicative of a characteristic of light reflected from a vertical increment of surface of each of said articles, selective means responsive to a predetermined characteristic level of said output, and means controlled by said selective means for sorting articles having a vertical increment with said predetermined characteristic level from said plurality of columns of articles.

14. Sorting apparatus for use in combination with a plurality of columns of freely falling articles comprising photosensitive means for scanning across said columns, said scanning means producing an output indicative of a characteristic of light reflected from the surface of each of said articles, selective means responsive to a predetermined characteristic level of said output, synchronizing means for correlating said selective means with said plurality of columns, and means responsive to both said synchronizing means and said selective means for sorting articles having said predetermined characteristic level from said plurality of columns of articles.

15. In sorting apparatus for in combination with a plurality of columns of freely falling articles, means to evaluate both the front and rear sides of said articles comprising a single photosensitive means for scanning across a field substantially transverse to the direction of motion of said articles, background reference means disposed adjacent said scanning means, image reflecting means disposed in the direct field of scan of said scanning means and so orientated that said background reference means lies in the reflected field of scan of said scanning means, said articles freely falling between said image reflecting means on one side and said scanning means and background means on the other, whereby each of said articles freely falls through both said direct and reflected fields of scan.

16. In a sorting apparatus for use in combination with a plurality of columns of moving articles passing through a zone comprising a single scanner arranged to scan in a transverse path of sweep across all said columns in said columns in said zone and for producing an output indicative of the characteristic of each article in all said columns, actuating means associated with each column for energizing selected articles in that column, and means synchronized with the sweep of said scanner and actuated by a predetermined output level of said output for actuating the actuating means associated with the particular column in which the article causing the predetermined output level is located and at a time when that article is passing its associated actuating means.

17. The structure defined in claim 16 wherein said actuating means includes a probe adjacent each of said columns and beyond said scanner, each such probe being energizable to electrically charge an article in its column, and deflector plates adjacent said columns for deflecting the charged article.

18. In a sorting apparatus, a source of light for shining on a zone, a single scanner having a horizontal sweep for sweeping in a path across said zone, feed means for feeding a plurality of columns of spaced articles across said zone in spaced individual paths about normal to the path of sweep of said scanner, sequence generator means synchronized with the sweep of said scanner for generating pulses corresponding to the sweep of said scanner, said scanner delivering an output signal indicative of a characteristic of light reflected from each article in each column, activating means arranged along each of said spaced individual paths for activating selected articles in each path, and coincidence gate means for receiving said output and said pulses and for selectively actuating said actuating means in response to said pulses and said output.

19. Method of sorting small articles which vary in their characteristics according to the individual characteristics of each article comprising passing the articles in predemined parallel paths at spaced intervals in each path electronically scanning in an oscillatory manner across the paths at a particular zone such that each article is scanned a plurality of times, creating signals synchronized with the scanning of the articles such that a signal is created for each path as that path is scanned, generating a pulse of an output corresponding to the characteristic of a particular article each time that article is scanned such that normal and abnormal pulses are created depending upon the condition of the article, and integrating the pulses and signals for activating selectively a particular path in a subsequent zone through which the paths pass such that the article causing the abnormal pulse is deflected from that path.

20. In a method of sorting small articles comprising passing such articles in a path past a color reference background, charging all articles in said path which do not correspond to said color reference and deflecting the charged articles from said path.

21. In a sorting device, means for passing a plurality of colored articles in a path, means for producing a background of a predetermined color, means for charging each article which does not correspond to said color and means for deflecting from the path the charged articles.

References Cited in the file of this patent

UNITED STATES PATENTS

| 2,184,161 | Stockbarger et al. | Dec. 19, 1939 |
| 2,287,808 | Lehde | June 30, 1942 |
| 2,646,880 | Frankel | July 28, 1953 |
| 2,656,923 | Cox | Oct. 27, 1953 |
| 2,891,722 | Nuttall et al. | June 23, 1959 |

FOREIGN PATENTS

| 642,283 | Great Britain | Aug. 30, 1950 |